(12) United States Patent
Mazzagatti et al.

(10) Patent No.: US 7,348,980 B2
(45) Date of Patent: Mar. 25, 2008

(54) METHOD AND APPARATUS FOR INTERFACE FOR GRAPHIC DISPLAY OF DATA FROM A KSTORE

(75) Inventors: Jane Campbell Mazzagatti, Blue Bell, PA (US); Robert Buckwalter, West Chester, PA (US)

(73) Assignee: Unisys Corporation, Blue Bell, PA (US)

( * ) Notice: Subject to any disclaimer, the term of this patent is extended or adjusted under 35 U.S.C. 154(b) by 411 days.

(21) Appl. No.: 11/014,494

(22) Filed: Dec. 16, 2004

(65) Prior Publication Data

US 2006/0114255 A1    Jun. 1, 2006

(51) Int. Cl.
G06T 11/20 (2006.01)
G06F 7/00 (2006.01)
(52) U.S. Cl. ........................................ 345/440; 707/100
(58) Field of Classification Search ................ 345/440; 707/100
See application file for complete search history.

(56) References Cited

U.S. PATENT DOCUMENTS

| | | | |
|---|---|---|---|
| 4,286,330 A | | 8/1981 | Isaacson |
| 5,245,337 A | | 9/1993 | Bugajski |
| 5,293,164 A | | 3/1994 | Bugajski |
| 5,592,667 A | | 1/1997 | Bugajski |
| 5,630,125 A | | 5/1997 | Zellweger |
| 5,634,133 A | * | 5/1997 | Kelley ........................ 715/503 |
| 5,829,004 A | | 10/1998 | Au |
| 5,894,311 A | * | 4/1999 | Jackson ...................... 345/440 |
| 5,918,229 A | | 6/1999 | Davis et al. |
| 5,930,805 A | | 7/1999 | Marquis |
| 5,963,965 A | | 10/1999 | Vogel |
| 5,966,709 A | | 10/1999 | Zhang |
| 5,970,490 A | | 10/1999 | Morgenstern |

(Continued)

FOREIGN PATENT DOCUMENTS

EP     0 079 465     1/1985

(Continued)

OTHER PUBLICATIONS

Gschia-Yuan Teng & David L. Neuhoff, "An Improved Hierarchical Lossless Text Compression Algrithm", Proceedings 1995 Data Compression Conference.

(Continued)

Primary Examiner—Chante Harrison
(74) Attorney, Agent, or Firm—Richard J. Gregson; Robert P. Marley; Caesar, Rivise, Bernstein, Cohen & Pokotilow, Ltd.

(57) ABSTRACT

A method for providing a display of data from an interlocking trees datastore in a graphical display system having a graphic display device is disclosed, the method including the steps of collecting display requirements for defining a value and at least one display characteristic to be displayed on the graphic display device and querying an interlocking trees datastore in accordance with the display requirements to determine the value to be displayed. At least one graphical display parameter is determined in accordance with the display requirements and the value to be displayed and the graphical display parameter are transmitted to the graphical display device for display of the value by the graphic display device.

33 Claims, 11 Drawing Sheets

U.S. PATENT DOCUMENTS

| | | | |
|---|---|---|---|
| 5,978,794 | A | 11/1999 | Agrawal et al. |
| 5,983,232 | A | 11/1999 | Zhang |
| 6,018,734 | A | 1/2000 | Zhang |
| 6,029,170 | A | 2/2000 | Garger |
| 6,031,993 | A | 2/2000 | Andrews et al. |
| 6,102,958 | A | 8/2000 | Meystel |
| 6,115,715 | A | 9/2000 | Traversat et al. |
| 6,138,115 | A | 10/2000 | Agrawal et al. |
| 6,138,117 | A | 10/2000 | Bayardo |
| 6,144,962 | A | 11/2000 | Weinberg et al. |
| 6,160,549 | A | 12/2000 | Touma et al. |
| 6,233,575 | B1 | 5/2001 | Agrawal et al. |
| 6,275,817 | B1 | 8/2001 | Reed et al. |
| 6,278,987 | B1 | 8/2001 | Reed et al. |
| 6,286,002 | B1 | 9/2001 | Axaopoulos et al. |
| 6,341,281 | B1 | 1/2002 | MacNicol et al. |
| 6,356,902 | B1 | 3/2002 | Tan et al. |
| 6,360,224 | B1 | 3/2002 | Chickering |
| 6,373,484 | B1 * | 4/2002 | Orell et al. .................. 345/420 |
| 6,381,600 | B1 | 4/2002 | Lau |
| 6,389,406 | B1 | 5/2002 | Reed et al. |
| 6,394,263 | B1 | 5/2002 | McCrory |
| 6,453,314 | B1 | 9/2002 | Chan et al. |
| 6,470,277 | B1 | 10/2002 | Chin et al. |
| 6,470,344 | B1 | 10/2002 | Kothuri et al. |
| 6,473,757 | B1 | 10/2002 | Garofalakis et al. |
| 6,477,683 | B1 | 11/2002 | Killian et al. |
| 6,499,026 | B1 | 12/2002 | Smith et al. |
| 6,505,184 | B1 | 1/2003 | Reed et al. |
| 6,505,205 | B1 | 1/2003 | Kothuri et al. |
| 6,581,063 | B1 | 6/2003 | Kirkman |
| 6,591,272 | B1 | 7/2003 | Williams |
| 6,604,114 | B1 | 8/2003 | Toong et al. |
| 6,615,202 | B1 | 9/2003 | Ding et al. |
| 6,624,762 | B1 | 9/2003 | End, III |
| 6,635,089 | B1 | 10/2003 | Burkett et al. |
| 6,662,185 | B1 | 12/2003 | Stark et al. |
| 6,681,225 | B1 | 1/2004 | Uceda-Sosa et al. |
| 6,684,207 | B1 | 1/2004 | Greenfield et al. |
| 6,691,109 | B2 | 2/2004 | Bjornson et al. |
| 6,704,729 | B1 | 3/2004 | Klein et al. |
| 6,711,585 | B1 | 3/2004 | Copperman et al. |
| 6,745,194 | B2 | 6/2004 | Burrows |
| 6,748,378 | B1 | 6/2004 | Lavender et al. |
| 6,751,622 | B1 | 6/2004 | Puri et al. |
| 6,760,720 | B1 | 7/2004 | De Bellis |
| 6,768,995 | B2 | 7/2004 | Thier et al. |
| 6,769,124 | B1 | 7/2004 | Schoening et al. |
| 6,799,184 | B2 | 9/2004 | Bhatt et al. |
| 6,804,688 | B2 | 10/2004 | Kobayashi et al. |
| 6,807,541 | B2 | 10/2004 | Bender et al. |
| 6,816,856 | B2 | 11/2004 | Baskins et al. |
| 6,826,556 | B1 | 11/2004 | Miller et al. |
| 6,831,668 | B2 | 12/2004 | Cras et al. |
| 6,868,414 | B2 | 3/2005 | Khanna et al. |
| 6,900,807 | B1 | 5/2005 | Liongosari et al. |
| 6,920,608 | B1 | 7/2005 | Davis |
| 6,931,401 | B2 | 8/2005 | Gibson et al. |
| 6,952,736 | B1 | 10/2005 | Westbrook |
| 6,965,892 | B1 | 11/2005 | Uceda-Sosa et al. |
| 7,027,052 | B1 * | 4/2006 | Thorn et al. ................ 345/440 |
| 7,228,296 | B2 | 6/2007 | Matsude |
| 2002/0124003 | A1 | 9/2002 | Rajasekaran et al. |
| 2002/0138353 | A1 | 9/2002 | Schreiber et al. |
| 2002/0143735 | A1 | 10/2002 | Ayi et al. |
| 2002/0143783 | A1 | 10/2002 | Bakalash et al. |
| 2002/0188613 | A1 | 12/2002 | Chakraborty et al. |
| 2002/0194173 | A1 | 12/2002 | Bjornson et al. |
| 2003/0009443 | A1 | 1/2003 | Yatviskly |
| 2003/0033279 | A1 | 2/2003 | Gibson et al. |
| 2003/0093424 | A1 | 5/2003 | Chun et al. |
| 2003/0115176 | A1 | 6/2003 | Bobroff et al. |
| 2003/0120651 | A1 | 6/2003 | Bernstein |
| 2003/0204513 | A1 | 10/2003 | Bumbulis |
| 2003/0204515 | A1 | 10/2003 | Shadmon et al. |
| 2003/0217334 | A1 | 11/2003 | Chung et al. |
| 2004/0107186 | A1 | 6/2004 | Najork et al. |
| 2004/0133590 | A1 | 7/2004 | Henderson et al. |
| 2004/0143571 | A1 | 7/2004 | Bjornson et al. |
| 2004/0169654 | A1 * | 9/2004 | Walker et al. .............. 345/440 |
| 2004/0230560 | A1 | 11/2004 | Elza et al. |
| 2004/0249781 | A1 | 12/2004 | Anderson |
| 2005/0015383 | A1 | 1/2005 | Harjanto |
| 2005/0050054 | A1 | 3/2005 | Clark et al. |
| 2005/0060325 | A1 | 3/2005 | Bakalash et al. |
| 2005/0071370 | A1 | 3/2005 | Atschul et al. |
| 2005/0080800 | A1 | 4/2005 | Parupudi et al. |
| 2005/0097108 | A1 | 5/2005 | Wang et al. |
| 2005/0102294 | A1 | 5/2005 | Coldewey |
| 2005/0149503 | A1 | 7/2005 | Raghavachari |
| 2005/0171960 | A1 | 8/2005 | Lomet |
| 2005/0179684 | A1 * | 8/2005 | Wallace ..................... 345/419 |
| 2005/0198042 | A1 * | 9/2005 | Davis ......................... 707/10 |
| 2005/0262108 | A1 | 11/2005 | Gupta |

FOREIGN PATENT DOCUMENTS

| | | |
|---|---|---|
| WO | WO 95/17783 | 6/1995 |
| WO | WO 99/34307 | 7/1999 |
| WO | WO 01/46834 | 6/2001 |
| WO | WO 02/026498 | 8/2002 |

OTHER PUBLICATIONS

Won Kim & Myung Kim, "Performance and Scaleability in Knowledge Engineering: Issues and Solutions", Journal of Object-Oriented Programming, vol. 12, No. 7, pp. 39-43, Nov./Dec. 1999.

Jeffrey O. Kephart & David M. Chess, "The Vision of Autonomic Computing", T.J. Watson Research Jan. 2003.

Linda Dailey Paulson, "Computer System, Heal Thyself", Aug. 2003.

Dave Gussow, "Headline: IBM-Enterprise Storage Server Shines at Colgate Palmolive", Jan. 6, 2003.

Caroline Humer, "IBM Creates Self-Healing Computer Unit", Jan. 8, 2003.

International Search Report PCT/US05/40264.

Burton F. W. et al:"Multiple Generation Text files Using Overlaping Tree Structures", Computer Journal, Oxford University Press, Surrey, GB. vol. 28, No. 4 Aug. 1985, pp. 414-416.

* cited by examiner

METHOD AND APPARATUS FOR INTERFACE FOR GRAPHIC DISPLAY OF DATA FROM A KSTORE

BACKGROUND OF THE INVENTION

1. Field of Invention

This invention relates to computing and in particular to the field of storing and accessing data in datastores.

2. Description of Related Art

One fundamental choice a developer makes when developing software is the selection of appropriate data structures to facilitate organizing and referencing data. Many different types of data structures are available, including linked lists, stacks, trees, arrays and others. Each data structure is associated with certain advantages and limitations.

The tree is a frequently-used data structure. One common form of tree is composed of a finite set of elements called nodes, linked together from a root to one or more internal nodes, each of which may be linked to one or more nodes, eventually ending in a number of leaf nodes. Data is typically stored in the nodes and can be referenced using the links from root to node to leaf and from parent to child and so on. Consequently, a hierarchal or sequential relationship may be attributed to data stored in the nodes of a tree structure.

One limitation of tree data structures is that typically a tree can only represent one hierarchy. One data structure that permits a plurality of hierarchies is an interlocking trees datastore. An interlocking trees datastore can be referred to as a KStore or merely a K. The structure of interlocking trees datastores, as well as the building and querying of the datastores, are described in U.S. patent application Ser. No. 10/385,421 (titled: SYSTEM AND METHOD FOR STORING AND ACCESSING DATA IN AN INTERLOCKING TREES DATASTORE, and filed on Mar. 10, 2003), Ser. No. 10/666,382 (titled: SYSTEM AND METHOD FOR STORING AND ACCESSING DATA IN AN INTERLOCKING TREES DATASTORE, and filed on Sep. 19, 2003) and Ser. No. 10/759,466 (titled: SAVING AND RESTORING AN INTERLOCKING TREES DATASTORE, and filed on Jan. 16, 2004).

The interlocking trees datastores are accessed by their engine using software that had to be custom built for each application. Furthermore, knowledge of the datastore itself was required in order to design the new interfaces required for each application requiring access to the interlocking trees datastore. Therefore, the use of the prior art datastore, K, with many different applications could be time consuming.

All references cited herein are incorporated herein by reference in their entireties.

BRIEF SUMMARY OF THE INVENTION

A general method for providing a display of data such as charts and graphs, from an interlocking trees datastore in a graphical display system having a graphic display device is disclosed, the method including the steps of collecting display requirements for defining at least one value and at least one display characteristic to be displayed on the graphic display device and querying an interlocking trees datastore in accordance with the display requirements to determine the value to be displayed. At least one graphical display parameter is determined in accordance with the display requirements and the value to be displayed and the graphical display parameter are transmitted to the graphical display device for display of the value by the graphic display device. The step of collecting the display requirements includes the further step of collecting at least one variable constraint and the variable constraint establishes a context. The graph or chart can have an x-axis and a y-axis and the step of collecting the display requirements includes the further step of collecting the display requirements for at least one x-axis value.

At least one constraint set can have a plurality of variable constraints for an x-axis value. At least one variable constraint is collected for an x-axis value and at least one variable constraint is collected for each x-axis value of a plurality of x-axis values. Other variable constraints may be collected to establish a context for the x-axis values, and would be combined with the at least one variable constraint for an x-axis value. The variable constraint establishes a context. The interlocking trees database is queried for at least one constraint count. When the graph or chart has an x-axis and a y-axis and the step of collecting the display requirements includes the further step of collecting at least one focus constraint for determining a y-axis value corresponding to each x-axis value, of the graph or chart.

At least one analytic type is collected and the interlocking trees database is queried in accordance with the analytic type. The interlocking trees datastore has a plurality of data records. At least one focus constraint is determined and the analytic type and the focus constraint are applied to the plurality of data records to determine a y-axis value. When at least one constraint is collected the interlocking trees database is queried for at least one corresponding constraint count in accordance with the number of times the constraint is referenced in the interlocking trees datastore. A plurality of constraints having a plurality of corresponding constraint counts is collected, and the constraints of the plurality of constraints are ordered in accordance with the counts of the plurality of constraint counts to provide ordered constraints. The interlocking trees database is queried in accordance with the ordered constraint counts. At least two constraints of a plurality of constraints are logically associated with each other to provide a constraint set and a y-axis value is determined for the constraint set. The analytic type can be any analytic routine.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
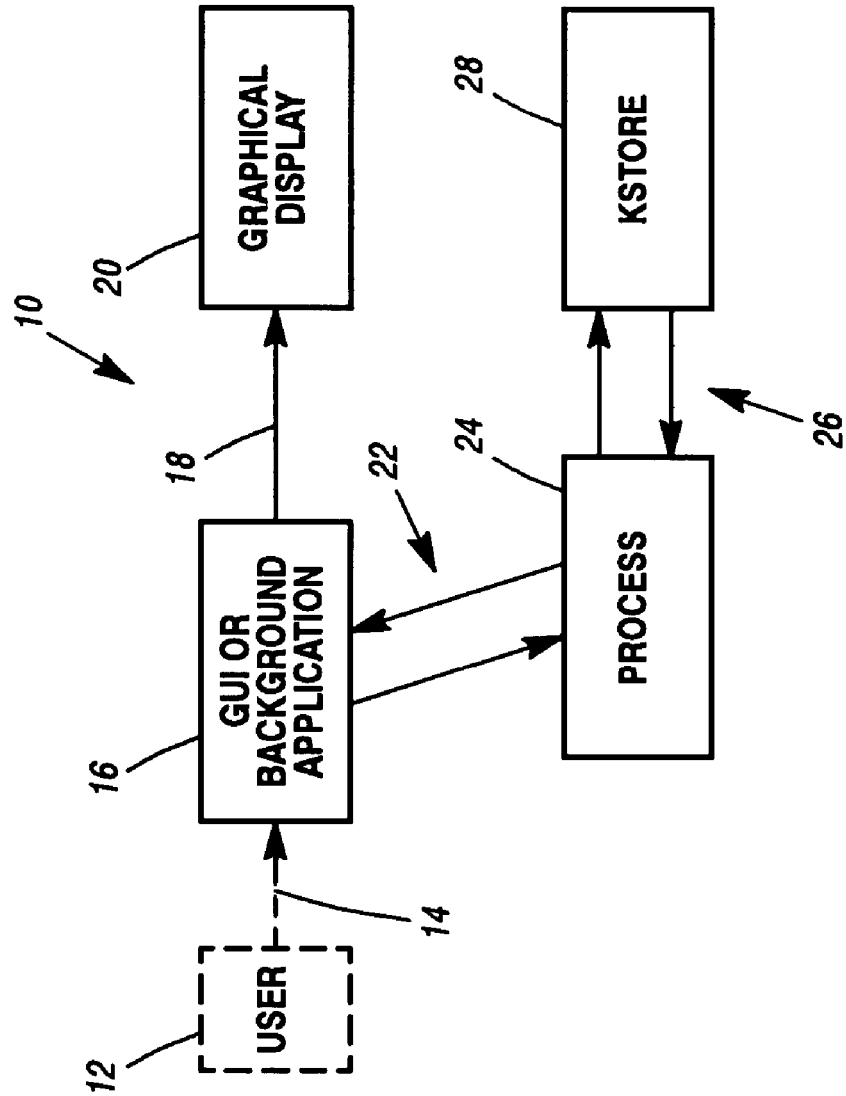
FIG. 1 is a block diagram representation of the graphical display system of the present invention.
Figure 2:
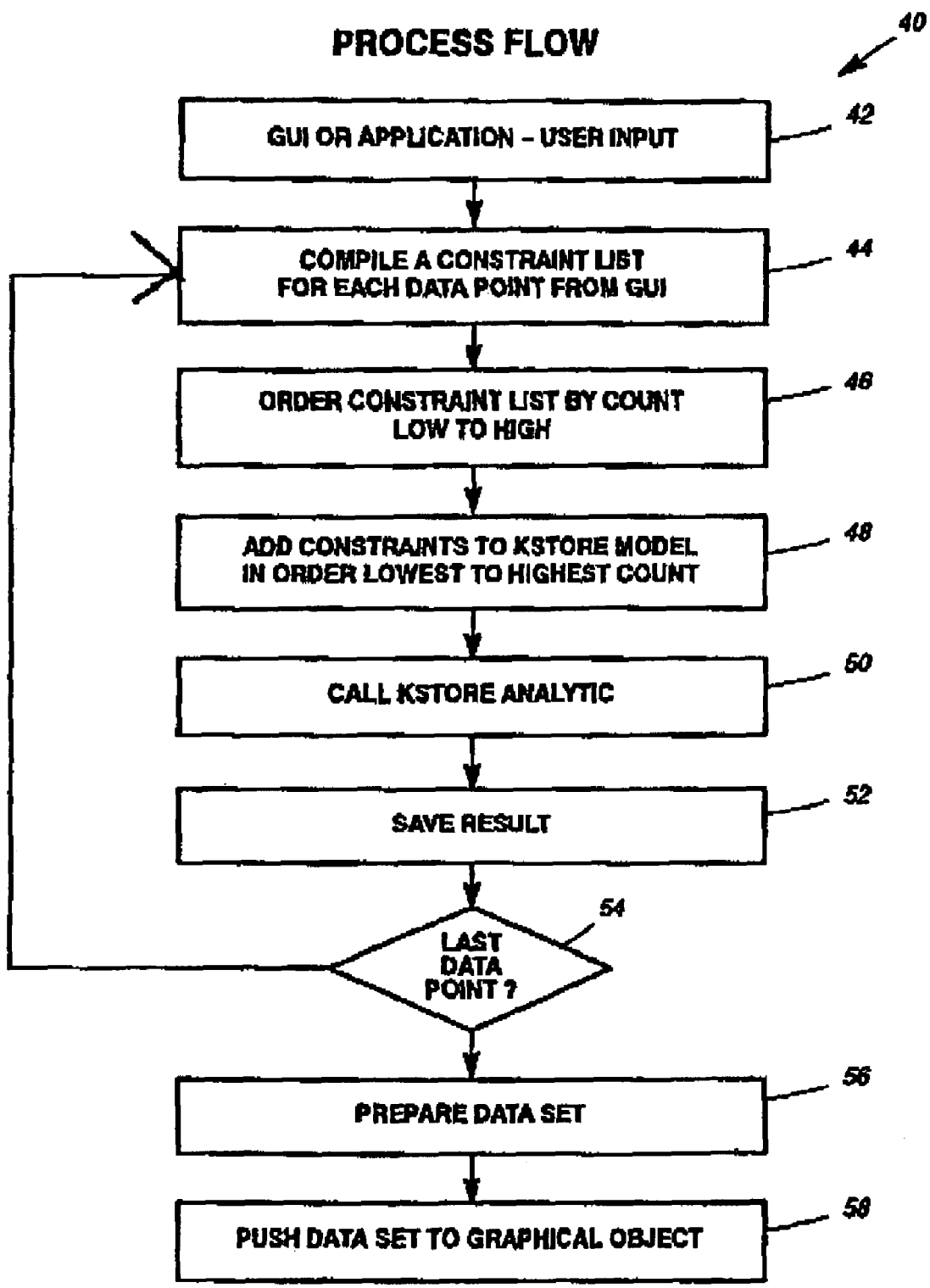
FIG. 2 is an algorithm for obtaining data stored in an interlocking trees datastore for display of the data within the system of FIG. 1.

Referring now to FIGS. 1, 2, there are shown the graphical display system 10 and the graphical display process flow 40 of the present invention. The graphical display system 10 permits a user 12 or a background application to query the KStore 28 and to display parameters obtained from the KStore 28 on the graphical display device 20. The graphical display process flow 40 operates within the blocks 16, 24 of the graphical display system 10. It controls transmission of input from the user 12 or background application, obtaining information from the KStore 28 in response to the input and pushing data to the graphical display device 20.

In one preferred embodiment of the invention, the block 16 of the graphical display system 10 can be a conventional graphical user interface (GUI) for receiving and transmitting data from the user 12. In this case, the block 16 is referred to as the GUI 16. In another preferred embodiment, the block 16 can be a background application. One background application that is well adapted for use with the graphical display system 10 in this manner is a corporate portal that must constantly update charts and graphs in real time with changing data from the KStore 28, wherein the constraints are fixed. When a user 12 is using the graphical display system 10, the user 12 can enter queries for the KStore 28 by way of the channel 14 and the GUI 16.

The GUI 16 communicates with the process block 24 by way of the bi-directional channel 22 in order to apply input from the user 12 or the background application to the process block 24. In this manner, the process block 24 can collect the display requirements for defining a display on the graphical display device 20. The input of the user 12 or the background application consists of constraints to be used to limit access to only the data of interest from the KStore 28 in order to obtain answers to queries entered. The constraints can include variable constraints (constraints that can vary according to user selections) or partial variable constraints, focus constraints (constraints that determine, for example, a y-axis value), filter constraints (context constraints that are combined with all other constraints to determine the data set to be used by the analysis routine) and others. The constraints collected by the process block 24 are discussed in more detail below.

Thus, when the graphical display process flow 40 receives the input as shown in block 42, a constraint list can be compiled for each data point as shown in block 44. While the system and method of the invention will operate with the constraints in substantially any order, significant improvements in the performance of the graphical display system 10 can be obtained by ordering the constraints received by the process flow 40 before adding them to the KStore 28. Thus, in a preferred embodiment of the invention the constraints are ordered starting with the ones that occur least frequently within the KStore 28 followed by the ones that occur most frequently.

Therefore, the process block 24 queries the KStore 28 for a constraint count corresponding to each constraint in the lists collected during execution of block 44. Using the constraint counts, the constraints are then ordered as shown in block 46. The ordered constraints are added to the KStore 28 as shown in block 48 and a KStore analytic is called as shown in block 50. The result is saved as shown in block 52. If there are any data points that have not been processed execution of the graphical display process flow 40 returns to block 44 as shown in decision 54. Otherwise, a data set is prepared as shown in block 56 and the data is pushed to the graphical display device 20 as shown in block 58 of the graphical display process flow 40.

Figure 3:
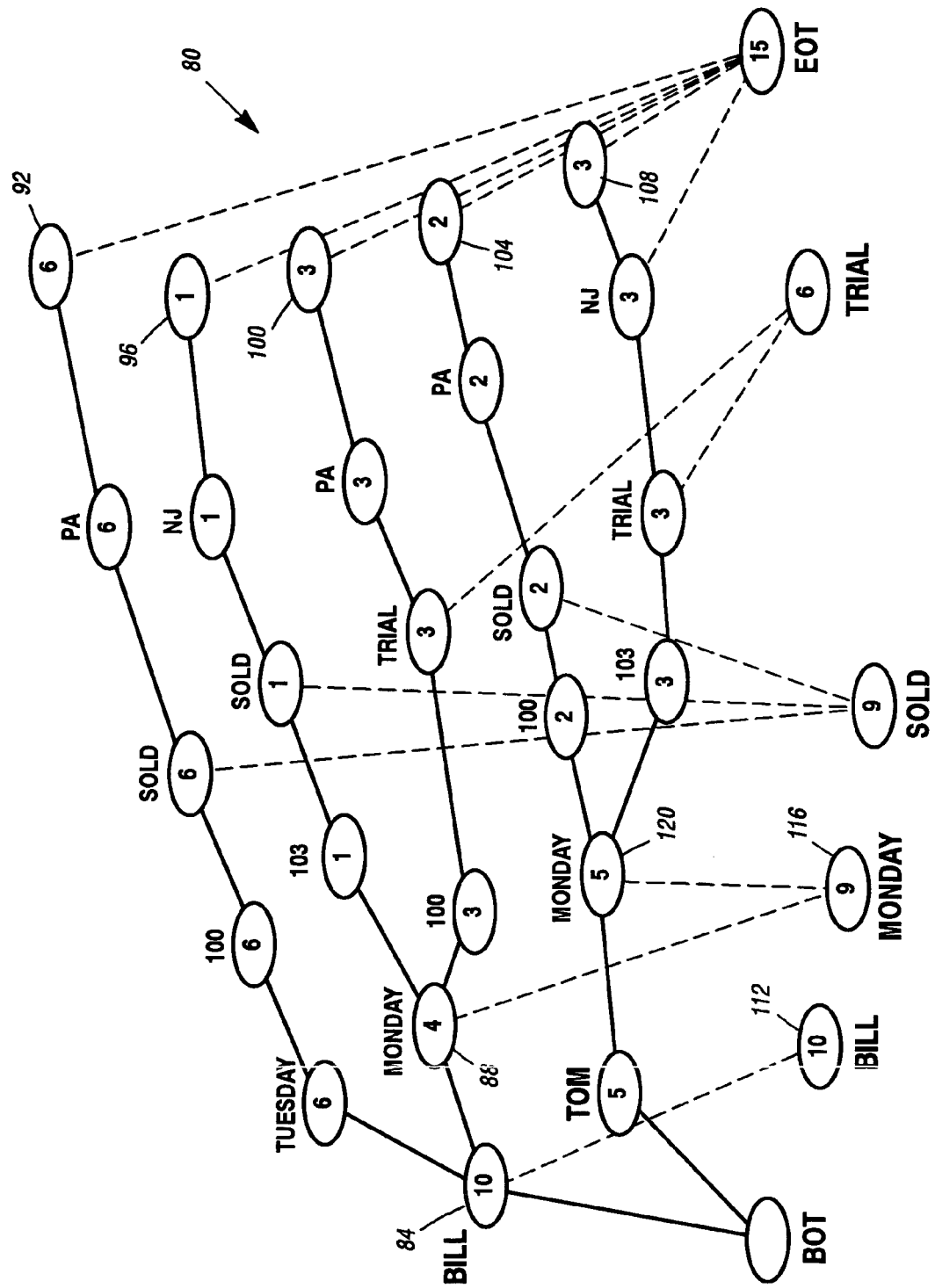
FIG. 3 is a block diagram of nodes in an interlocking trees datastore.

Referring now to FIG. 3, there is shown the interlocking trees datastore 80 suitable for use in the present invention. The interlocking trees datastore 80 can be used to illustrate some of the operations of blocks 44, 46, 48, 50 of the graphical display process 40 operating within the process block 40 of the graphical display system 10.

The interlocking trees datastore 80 is a diagrammatic representation of the KStore 28 of the graphical display system 10. Data records such as the data records shown in the Table below can be imported into the interlocking trees datastore 80 and stored for accessing and display by the user 12 or background application using the graphic display process flow 40. Note that the actual KStore 28 resides in a memory of a computer system (not shown). Furthermore, the nodes of the interlocking trees datastore 80 do not contain any data or strings. All of the links between the nodes of the database 80 are pointers.

TABLE

| Bill | Tuesday | 100 | sold | PA |
|------|---------|-----|------|-----|
| Bill | Tuesday | 100 | sold | PA |
| Bill | Tuesday | 100 | sold | PA |
| Bill | Tuesday | 100 | sold | PA |
| Bill | Tuesday | 100 | sold | PA |
| Bill | Tuesday | 100 | sold | PA |
| Bill | Monday | 103 | sold | NJ |
| Bill | Monday | 100 | trial | PA |
| Bill | Monday | 100 | trial | PA |
| Bill | Monday | 100 | trial | PA |
| Tom | Monday | 100 | sold | PA |
| Tom | Monday | 100 | sold | PA |
| Tom | Monday | 100 | trial | NJ |
| Tom | Monday | 100 | trial | NJ |
| Tom | Monday | 100 | trial | NJ |
| Tom | Monday | 100 | trial | NJ |

The variable constraints collected by block 44 of the process flow 40 when querying the KStore 28 can be, for example, Bill and Monday. The endproduct node 112 represents Bill and Monday is represented by the endproduct node 116. The construction of the endproduct nodes from the elemental nodes, and some of the endproduct nodes are not shown. The count for each constraint is represented in the interlocking trees datastore 80 as a numeral within the corresponding node. Thus, when the counts are obtained by block 46 for ordering the constraints, a count of 10 is obtained for Bill as shown in elemental node 112 and a count of 9 is obtained for Monday as shown in the elemental node 116. Since the count for Monday is lower than the count for Bill, the constraint Monday is added to the KStore 28 before Bill in the preferred embodiment.

The user 12 can input a query into the graphical display system 10 in order to determine how many transactions Bill made on Monday. In response the interlocking trees datastore 80 can be traversed from Monday's endproduct node 116 to nodes 88, 120 and, therefrom, to endproduct nodes 96, 100, 104, 108. The interlocking trees datastore 80 can then be traversed from Bill's endproduct node 112 to node 84 and, therefrom, to endproduct nodes 96, 100. The need to traverse from node 84 to product node 92 is eliminated since it was learned that there are no Monday transactions in that path when traversing from Monday's endproduct node 116.

It will be understood that further constraints can be added to the datastore 80 in this manner. For example, the variable constraint 'sold' can be added, thereby eliminating endproduct node 100.

The intersection of the traversals for the Bill and Monday constraints is therefore endproduct nodes 96, 100. Product nodes 96, 100 have counts of 1 and 3, respectively. Accordingly, as shown in block 50, a count analytic could be called to add the two counts and determine that Bill had 4 transactions on Monday.

Figure 4:
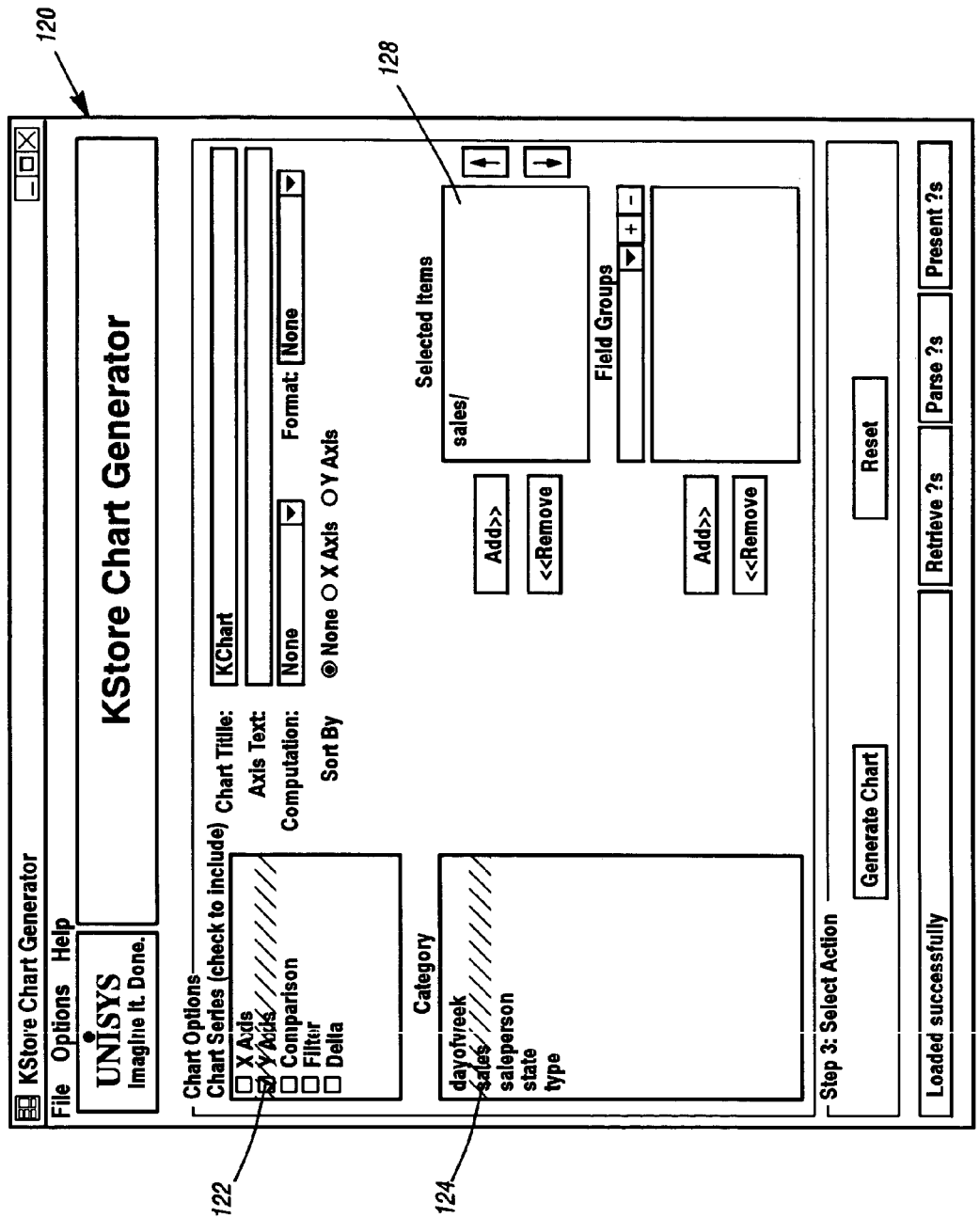
FIG. 4 is a screen shot of a graphical user interface suitable for use in the graphical display system of FIG. 1.
Figure 5:
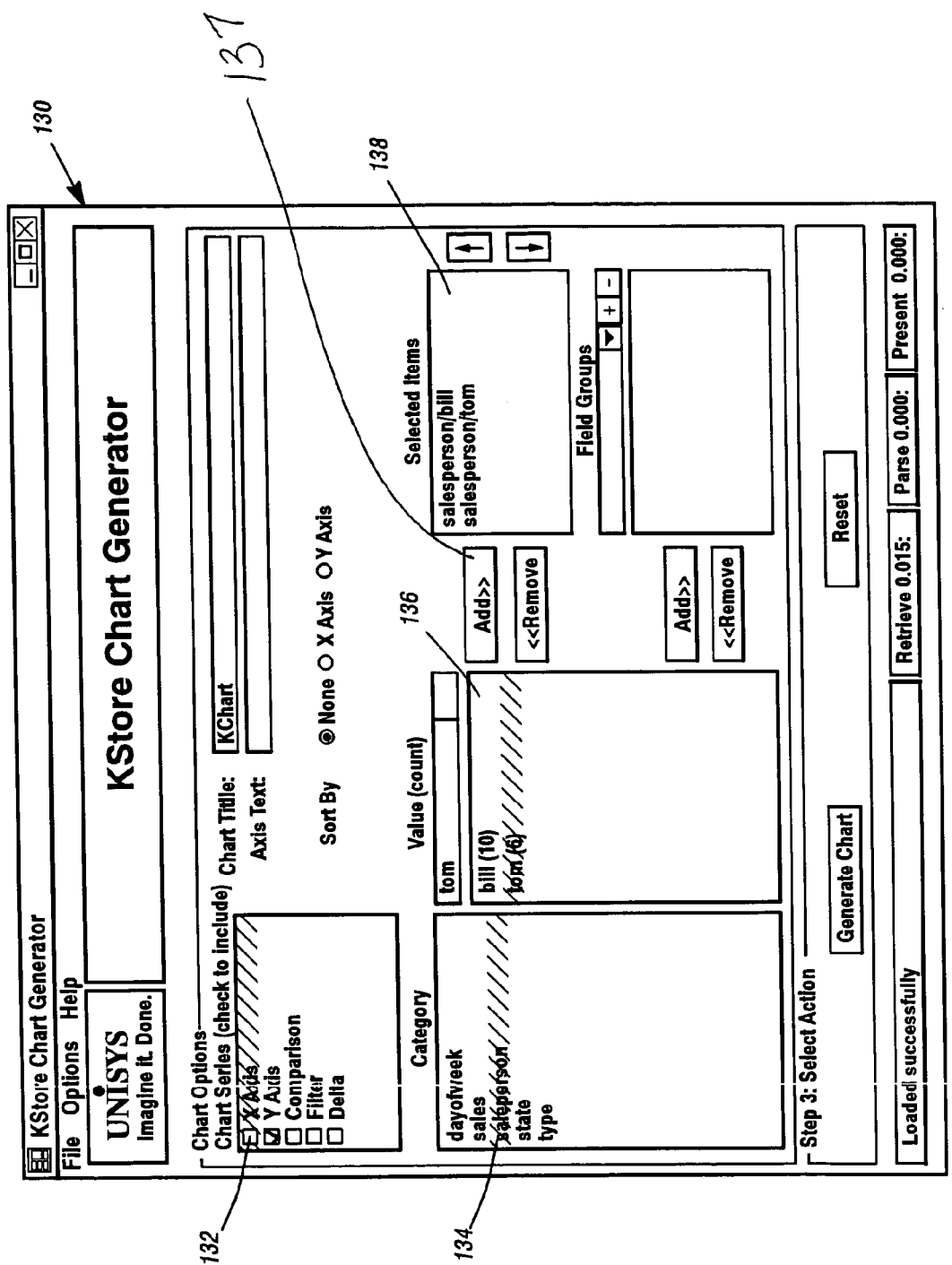
FIG. 5 is a screen shot of a graphical user interface suitable for use in the graphical display system of FIG. 1.
Figure 6:
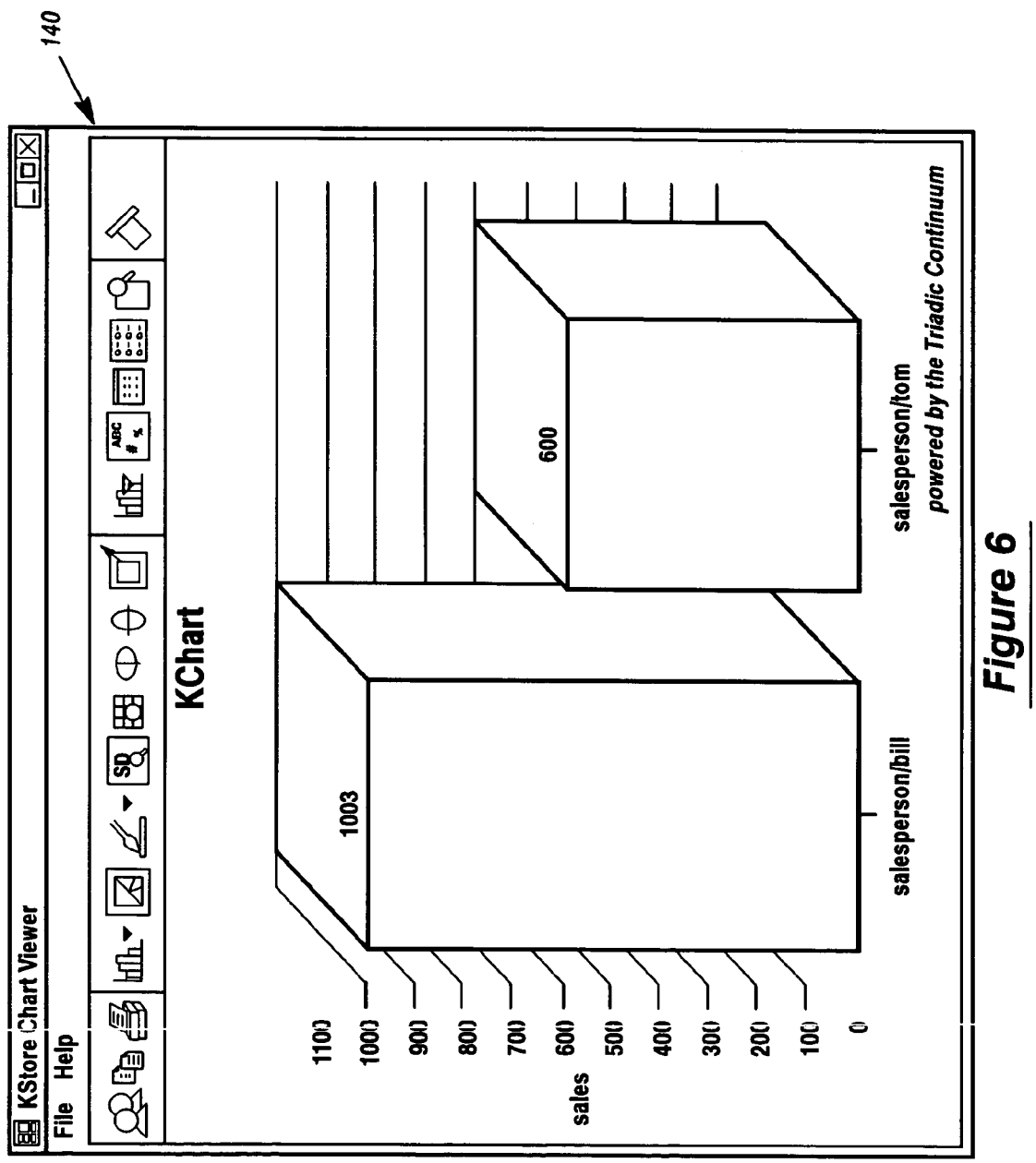
FIG. 6 is a graphical representation provided by the graphical display system of FIG. 1.

Referring now to FIGS. 4-6, there are shown the chart generator interface screen shots 120, 130, as well as a graphical representation 140. The graphical representation 140 is provided by the graphical display system 10 in accordance with data entered by the user 12 as shown in the screen shots 120, 130. The chart generator interface represented by the screen shots 120, 130 can be used by the user 12 to conveniently input constraints into the graphical display system 10 to be processed by the graphical display process flow 40 and query the KStore 28 in order to provide a display on the graphical display 20. However, it will be understood by those skilled in the art that any type of interface can be used to receive the input from the user 12 in keeping with the spirit and scope of the invention.

Since the chart being generated using the interface shown in the screen shots 120, 130 is an xy graph the user 12 must select an axis for the constraint to be entered as shown at block 122. Since the y-axis is selected on the screen shot 120 the user is adding a focus or a context constraint. In this example the user has selected the sales field and added it into the selected items box 128. Additionally with additions to the screen, the possible variable constraints are also displayed on the screen shot 120, for example dayoftheweek, sales, salesperson etc. The user could then select a variable constraint for both Bill and Tom by highlighting an item on the list and operating the add button 126 causing the highlighted item to appear in the selected items field 128.

In the screen shot 130 the user 12 is selecting the variable constraints for the values along the x-axis as shown by the highlight 132. As shown by the highlight 134 a 'salesperson' is being selected. When salesperson is highlighted in this manner the salespersons available for selection are displayed in the field 136 of the screen shot 130. By highlighting a selection in this manner and operating the add button 137 the user 12 can add salespersons to the list 138 of variable constraints in the selected items field 138. When the user 12 has inputted all of the constraints required the generate chart button 139 can be operated. The graphical display process flow 40 adds the constraints in the field 138 to the interlocking trees datastore 80 as previously described and the graphical representation 140 is provided on the graphical display device 20. Graphical representation 140 includes two bars representing the total sales, as selected on screen shot 120, for both Bill and Tom, as selected on screen shot 130.

Figure 7:
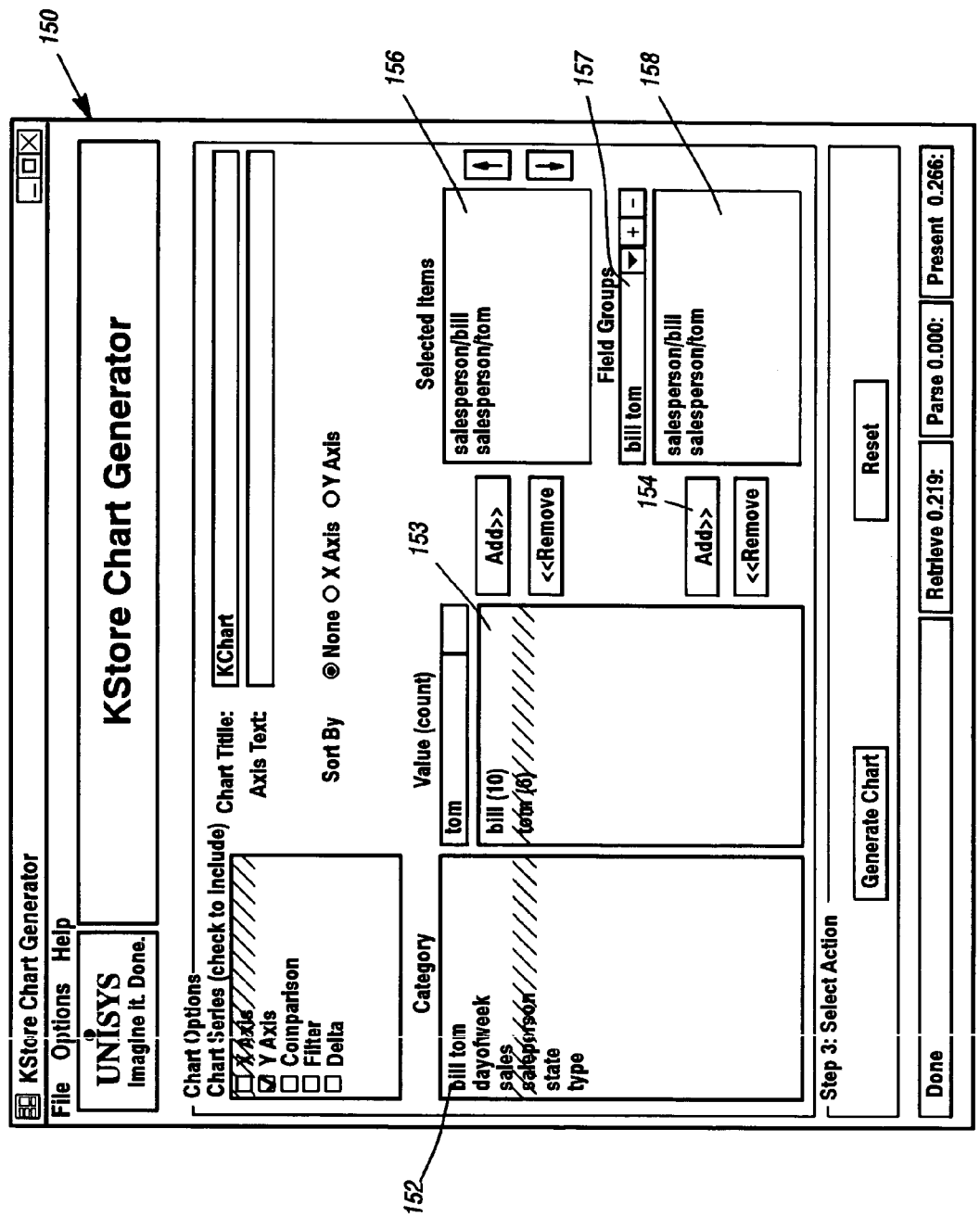
FIG. 7 is a screen shot of a graphical user interface suitable for use in the graphical display system of FIG. 1.
Figure 8:
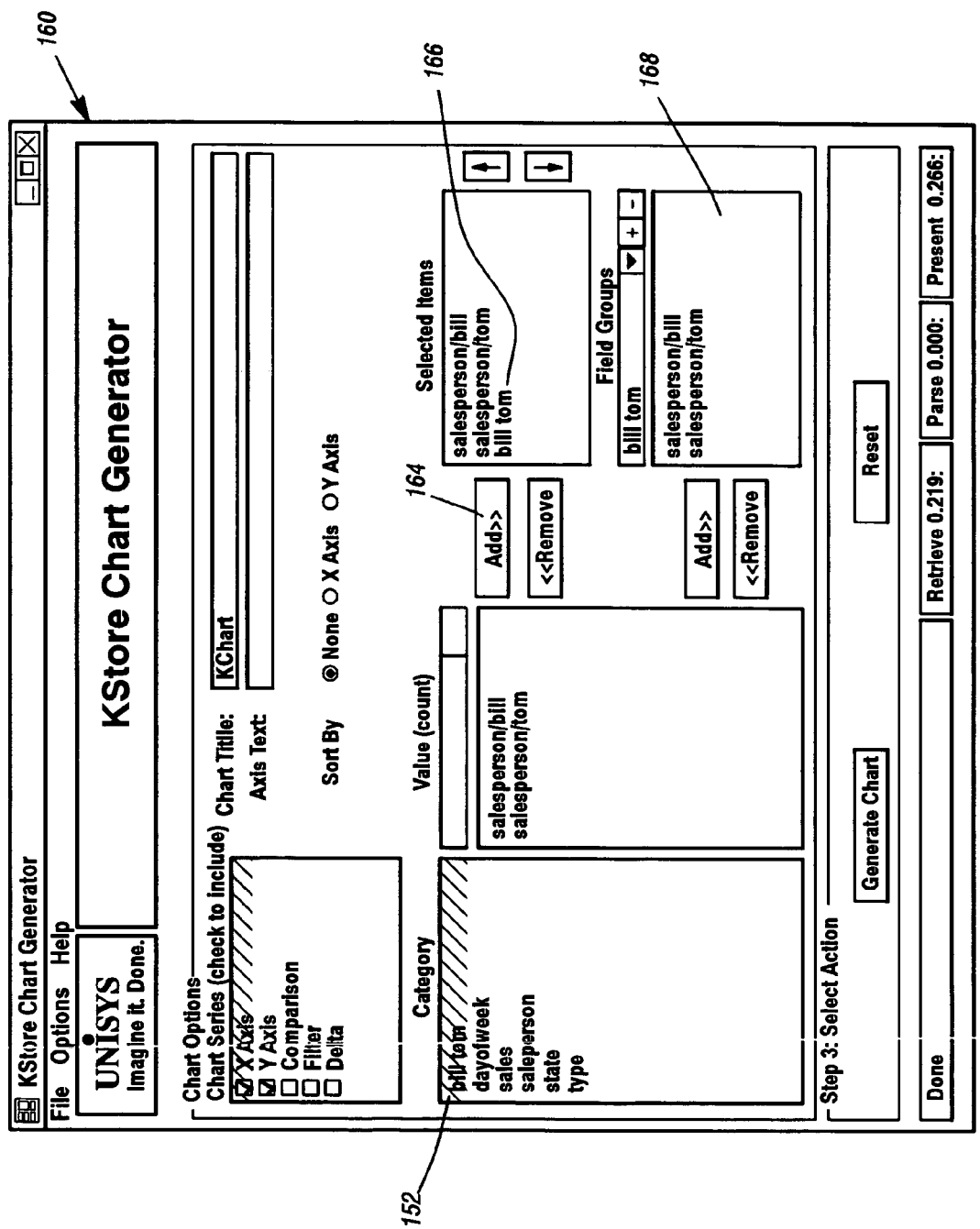
FIG. 8 is a screen shot of a graphical user interface suitable for use in the graphical display system of FIG. 1.
Figure 9:
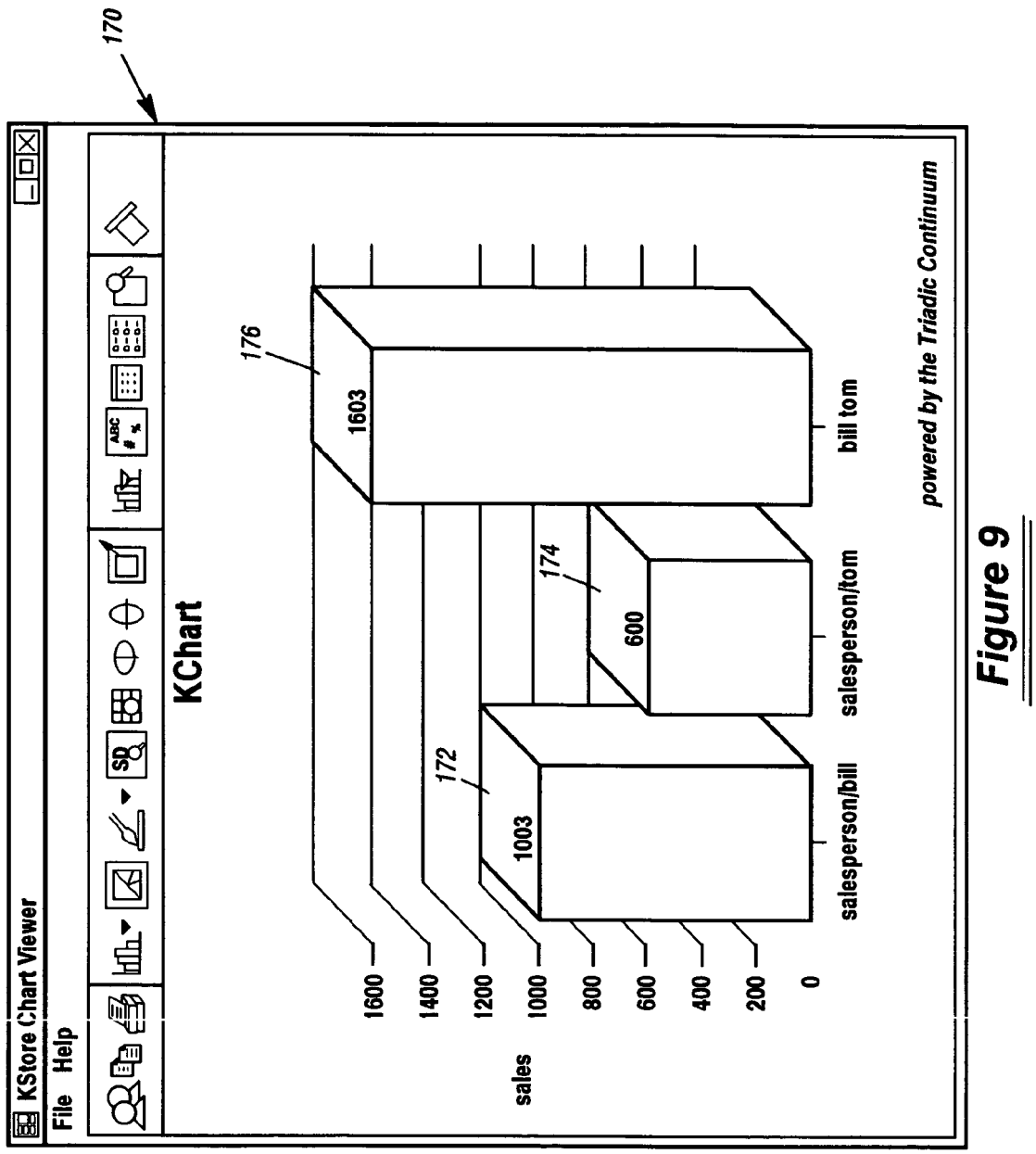
FIG. 9 is a graphical representation provided by the graphical display system of FIG. 1.

Referring now to FIGS. 7-9, there are shown the chart generator interface screen shots 150, 160, as well as a graphical representation 170 provided in accordance with data entered by the user 12 as shown in the screen shots 120, 130. The chart generator interface represented by the screen shots 150, 160 can be used by the user 12 to conveniently input constraints into the graphical display system 10 to be processed by the graphical display process flow 40 and query the KStore 28 in order to provide a display on the graphical display device 20.

The screen shot 150 shows the selection of the variable constraints Bill and Tom substantially as shown in the screen shot 130. However, the screen shot 150 differs from the screen shot 130 in that it includes a field grouping. A field grouping is a constraint set having a user defined logical relation between them, whereby other constraints such as a focus constraint or a filter constraint can be added to the entire set. In the example of the screen shot 150 a field grouping 'bill tom' is defined and the sales focus constraint is applied to the field grouping to provide the total sales of both salespersons.

Bill and Tom are selected from the list of possible variable constraints shown in the field 153 of the screen shot 150. When they are selected, and the add button is pressed, they are displayed in the field 156. Additionally, the add button 154 allows the user 12 to select from the same list of possible variable constraints and add the selections to the field grouping list 158. The field grouping list 158 thus shows that Bill and Tom have been added using the add button 154. The field grouping list is given the title 'bill tom' as shown in the field 157.

When a field grouping is defined in this manner it can be added to the category list as shown at category 152, which sets forth shown in the screen shot 160 the 'bill tom' field group. Using the add button 164 the 'bill tom' field group can be added to the selected variable constraints along with 'salesperson/bill' and 'salesperson/tom'. When the generate chart button 166 is operated the graphical representation 170 is produced. The graphical representation 170 includes the total sales for Bill, as represented by the bar 172 and for Tom as represented by bar the 174. Additionally, the graphical representation 170 includes a bar 176 representing the sum of the bars 172, 174 as determined by an additional call of the sum analytic within the graphical display process flow 40.

Figure 10:
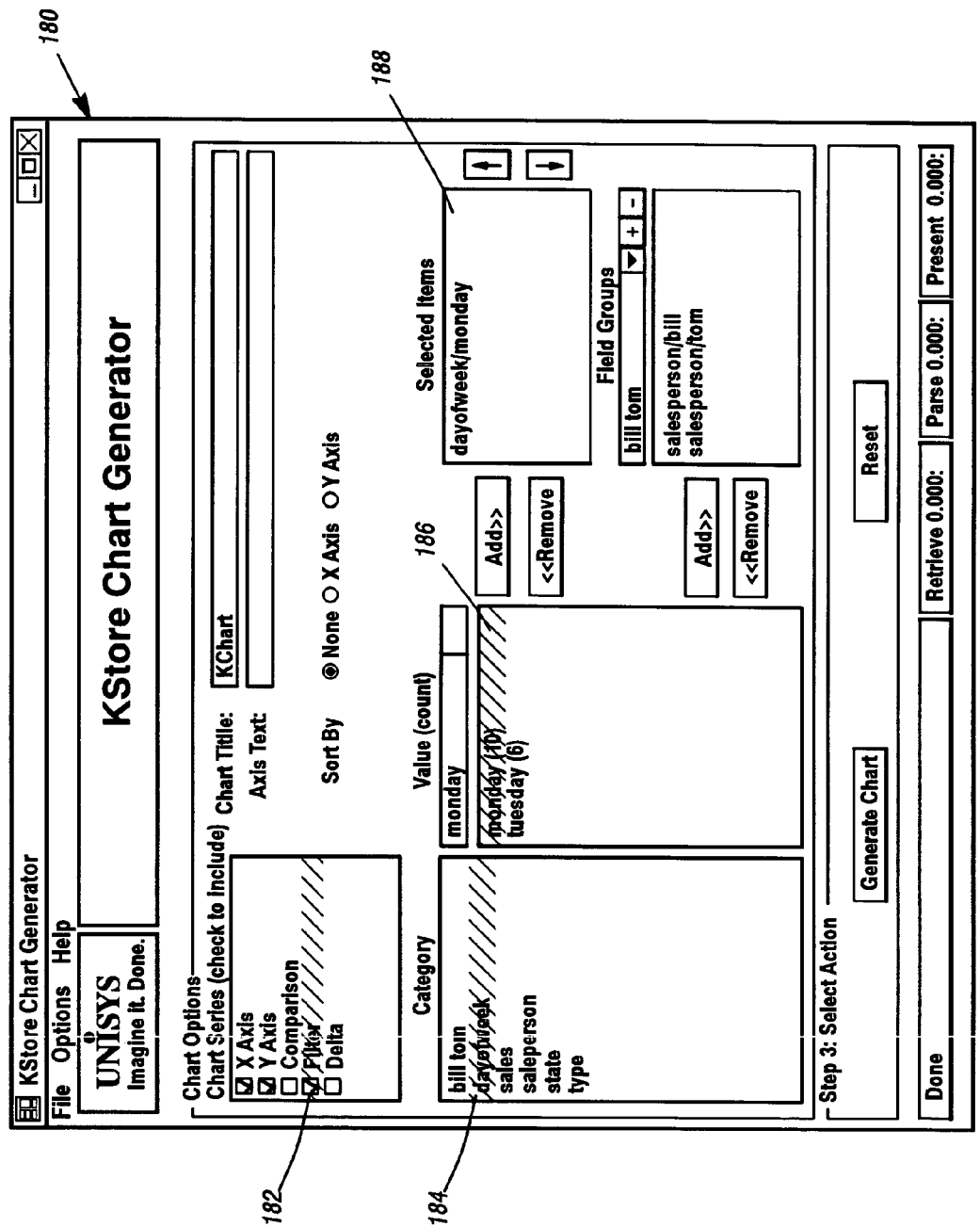
FIG. 10 is a screen shot of a graphical user interface suitable for use in the graphical display system of FIG. 1.
Figure 11:
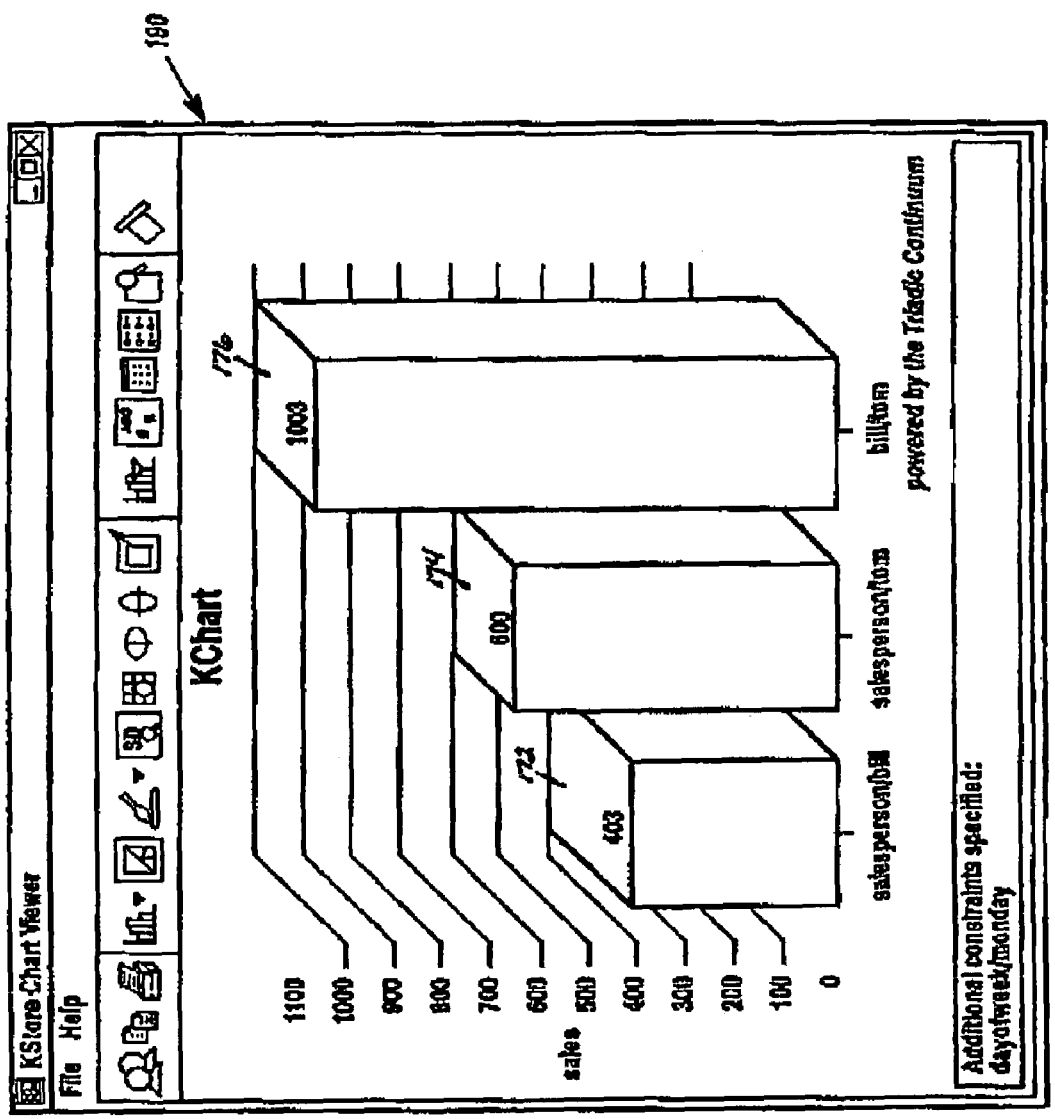
FIG. 11 is a graphical representation provided by the graphical display system of FIG. 1.

Referring now to FIGS. 10-11, there are shown the chart generator interface screen shot 180 and a graphical representation 190. The graphical representation 190 is provided in accordance with data entered by the user 12 as shown in the screen shot 180. In the screen shot 180 the filter block 182 is checked, in addition to the blocks for the x and y axes. As shown at the highlight 184, 'dayoftheweek' is selected. The selection of 'dayoftheweek' causes the available days to be displayed. Monday is selected from the display as shown at highlight 186. When the add button is operated the Monday filter or context constraint for all processing, is added to the field 188. The graphical representation 190 is produced when the generate chart button is pushed. Comparing the values of the graphical representation 190 with the values of the graphical representation 170 it can be seen that by including only Monday sales all three bars are lower.

Other constraints that can be selected within the graphical display system 10 include the comparison constraint, the count analytic and the delta constraint. The comparison constraint allows the user 12 to select items for comparison with each of the selected x-axis values. The delta constraint permits two items to be subtracted to illustrate a change, typically the items are time to show a change between two time periods.

In addition to the sum analytic, the process flow 40 can include any analytic the user 12 defines. For example, the process flow 40 can include total and percent analytics for accounting. For descriptive statistics it can include analytics such as average, mean, count, distinct count, maximum, minimum, product and rank. Probability analytics include predictive statistics. Analytics for association rules, classification, Bayes classification, market basket and decision trees may be used for data mining. Furthermore, the process flow 40 can include different kinds of predictor analytics.

For example, a single variable predictor analytic can be provided for returning the probability of a focus variable, wherein the probability of the focus variable can be the number of data records containing the focus variable divided by the total number of data records. Furthermore, the probabilities can be calculated in any other manner useful to the user 12.

A contexted classification analytic can be provided for returning the classification of a sample within context. This is determined by constraining a data set by the sample variables so that only the records containing all of the variables selected are considered. A Naive Bayes classification analytic can be provided to return the classification of a sample using Bayes theorem.

In the preferred embodiment of the invention the user 12 is permitted to perform all of the operations necessary to provide charts in a useful format. For example, using the GUI 16 the user can name the chart, display text relative to the axes of the chart and sort the chart data. The data can be sorted according to various parameters, such as name, value on the x-axis and comparisons. The values within each x value entry can be stacked and the percentages of the total for each value can be displayed. All settings provided by the user 12 can be saved.

While the invention has been described in detail and with reference to specific examples thereof, it will be apparent to one skilled in the art that various changes and modifications can be made therein without departing from the spirit and scope thereof.

What is claimed is:

1. A method for providing displays of data including graphs or charts from an interlocking trees datastore having datastore nodes in a graphical display system having a graphic display device, comprising the steps of:
    collecting display requirements for defining at least one value and at least one display characteristic to be displayed on said graphic display device;
    querying an interlocking trees datastore in accordance with said display requirements to determine said value to be displayed wherein said querying includes traversing said nodes of said interlocking trees datastore from elemental root nodes through combinations of subcomponent nodes and end-product nodes using asCase and asResult bi-directional links to determine the paths of said interlocking trees datastore needed to define said at least one value;
    determining at least one graphical display parameter in accordance with said display requirements and said value to be displayed;
    and transmitting said graphical display parameter to said graphical display device for displaying of said value to be displayed by said graphic display device.

2. The method for providing a display of data from an interlocking trees datastore of claim 1, wherein the step of collecting said display requirements comprises the further step of collecting at least one variable constraint.

3. The method for providing a display of data from an interlocking trees datastore of claim 2, wherein said variable constraint establishes a context.

4. The method for providing a display of data from an interlocking trees datastore of claim 2, wherein said graph or chart has an x-axis and a y-axis and the step of collecting said display requirements comprises the further step of collecting a variable constraint for a plurality of x-axis values.

5. The method for providing a display of data from an interlocking trees datastore of claim 1, comprising the further step of querying said interlocking trees database for at least one constraint count.

6. The method for providing a display of data from an interlocking trees datastore of claim 1, wherein said graph or chart has an x-axis and a y-axis and the step of collecting said display requirements comprises the further step of collecting at least one focus constraint for determining a y-axis value of said graph or chart.

7. The method for providing a display of data from an interlocking trees datastore of claim 6, wherein the step of collecting said display requirements comprises the further step of collecting a plurality of foci for determining a plurality of y-axis values of said graph or chart.

8. The method for providing a display of data from an interlocking trees datastore of claim 1, wherein the step of collecting said display requirements comprises the further step of collecting at least one analytic type.

9. The method for providing a display of data from an interlocking trees datastore of claim 8, comprising the further step of querying said interlocking trees database in accordance with said analytic type.

10. The method for providing a display of data from an interlocking trees datastore of claim 9, said graph or chart having an x-axis and a y-axis, and said interlocking trees database having a plurality of data records wherein the step of collecting said display requirements comprises the further steps of: determining at least one focus contraint; and applying type and said focus constraint to said plurity of data records to determine a y-axis value.

11. The method for providing a display of data from an interlocking trees datastore of claim 8, wherein said analytic type comprises a descriptive analytic type such as but not limited to a sum analytic.

12. The method for providing a display of data from an interlocking trees datastore of claim 8, wherein said analytic type comprises a predictive analytic type such as but not limited to the probability analytic.

13. The method for providing a display of data from an interlocking trees datastore of claim 1, comprising the further steps of: collecting at least one constraint; and querying said interlocking trees database for at least one corresponding constraint count in accordance with the number of times said constraint is referenced in said interlocking trees datastore.

14. The method for providing a display of data from an interlocking trees datastore of claim 13, wherein a plurality of constraints having a plurality of corresponding constraint counts is collected, comprising the further step of ordering the constraints of said plurality of constraints in accordance with the counts of said plurality of constraint counts to provide ordered constraints.

15. The method for providing a display of data from an interlocking trees datastore of claim 14, comprising the further step of querying said interlocking trees database in accordance with said ordered constraint counts.

16. The method for providing a display of data from an interlocking trees datastore of claim 13, wherein said graph or chart has y-axis comprising the further steps of: logically associating at least two constraints of said plurality of constraints with each other to provide a constraint set; and determining a y-axis value for said constraint set.

17. The method for providing a display of data from an interlocking trees datastore of claim 1, wherein said graphical display system includes a graphical user interface having a plurality of fields for displaying a plurality of lists of constraints for querying said interlocking trees datastore comprising the further steps of: selecting a field of said plurality of fields, said selected field having a list of said plurality of lists; selecting at least one constraint from said selected list; and querying said interlocking trees datastore in accordance with said selected constraint.

18. The method for providing a display of data from an interlocking trees datastore of claim 17, comprising the further step of selecting a plurality of constraints from said selected list.

19. The method for providing a display of data from an interlocking trees datastore of claim 17, wherein said graph or chart has an x-axis and a y-axis and the step of collecting said display requirements comprises the further step of collecting a variable constraint for a plurality of x-axis values.

20. The method for providing a display of data from an interlocking trees datastore of claim 17, wherein said selected constraint comprises a variable constraint.

21. The method for providing a display of data from an interlocking trees datastore of claim 20, wherein said variable constraint establishes a context.

22. The method for providing a display of data from an interlocking trees datastore of claim 17, wherein said selected constraint comprises a focus.

23. The method for providing a display of data from an interlocking trees datastore of claim 17, comprising the further step of transmitting said graphical display parameter to said graphical display device by way of said graphical user interface, collecting display requirements for defining at least one value and at least one display characteristic to be displayed on said graphic display device.

24. An apparatus for providing displays of data of interest to a user on graphic display device, said displays including graphs or charts from said data of interest derived from an interlocking trees datastore having datastore nodes, comprising:
 a collector for collecting display requirements, said display requirements collected for defining at least one value and at least one display characteristic to be displayed on said graphic display device;
 a query component for enabling a query of an interlocking trees datastore in accordance with said display requirements to determine said value to be displayed, including traversing said nodes of said interlocking trees datastore from elemental root nodes through combinations of subcomponent nodes and end-product nodes using asCase and asResult bi-directional links to determine the paths of the interlocking trees datastore needed to define said at least one value;
 wherein said collector component determines at least one graphical display parameter in accordance with said display requirements and said at least one value to be displayed; and
 a display component for enabling the display of said at least one value to be displayed by said graphic display device to provide a visual display of data for viewing by said user in accordance with said graphical display parameter.

25. The apparatus for providing a display of data from an interlocking trees datastore of claim 24, wherein said collector is operable to collect one or more than one constraints to establish a context, for x or y values.

26. The apparatus for providing a display of data from an interlocking trees datastore of claim 24, wherein said query component queries said interlocking trees datastore for at least one constraint count.

27. The apparatus of claim 26 wherein when there are a plurality of constraints having a plurality of corresponding constraint counts said plurality of constraints is ordered for determining said at least one value, said ordering arranged in accordance with the counts of said plurality of constraint counts to provide ordered constraints.

28. The apparatus for providing a display of data from an interlocking trees datastore of claim 24, wherein said graph or chart has an x-axis and a y-axis and wherein said collector is enabled to collect at least one focus constraint for determining a y-axis value of said graph or chart.

29. The apparatus of claim 24, wherein said apparatus also enables processing of data from said interlocking trees datastore through use of a selected at least one analytic type component.

30. The apparatus for providing a display of data from an interlocking trees datastore of claim 24, wherein said graphical display system includes a graphical user interface for facilitating use of said apparatus, said graphical user interface having a plurality of fields for displaying a plurality of lists of constraints for querying said interlocking trees datastore, wherein a selected field of said plurality of fields has a list of said plurality of lists; wherein said graphical user interface allows selection of a one of said plurality of lists and selection of at least one constraint to be selected from said selected list; thus enabling via said apparatus a query of said interlocking trees datastore in accordance with said selected constraint.

31. The apparatus of claim 30, wherein said graphical user interface allows for selection of at least one analytic component for analyzing data obtained via at least one query of said interlocking trees datastore.

32. The apparatus for providing a display of data from an interlocking trees datastore of claim 24, wherein said graph or chart has an x-axis and a y-axis and wherein at least one variable constraint is collected for at least one x-axis values.

33. The apparatus for providing a display of data from an interlocking trees datastore of claim 24, further comprising at least one graphical display parameter transmitted to said graphical display device by way of said graphical user interface.

* * * * *